WHELPLEY & STORER.
Improvement in the Process of Roasting, Burning, and Smelting Ores.
No. 4,898. Reissued May 7, 1872.
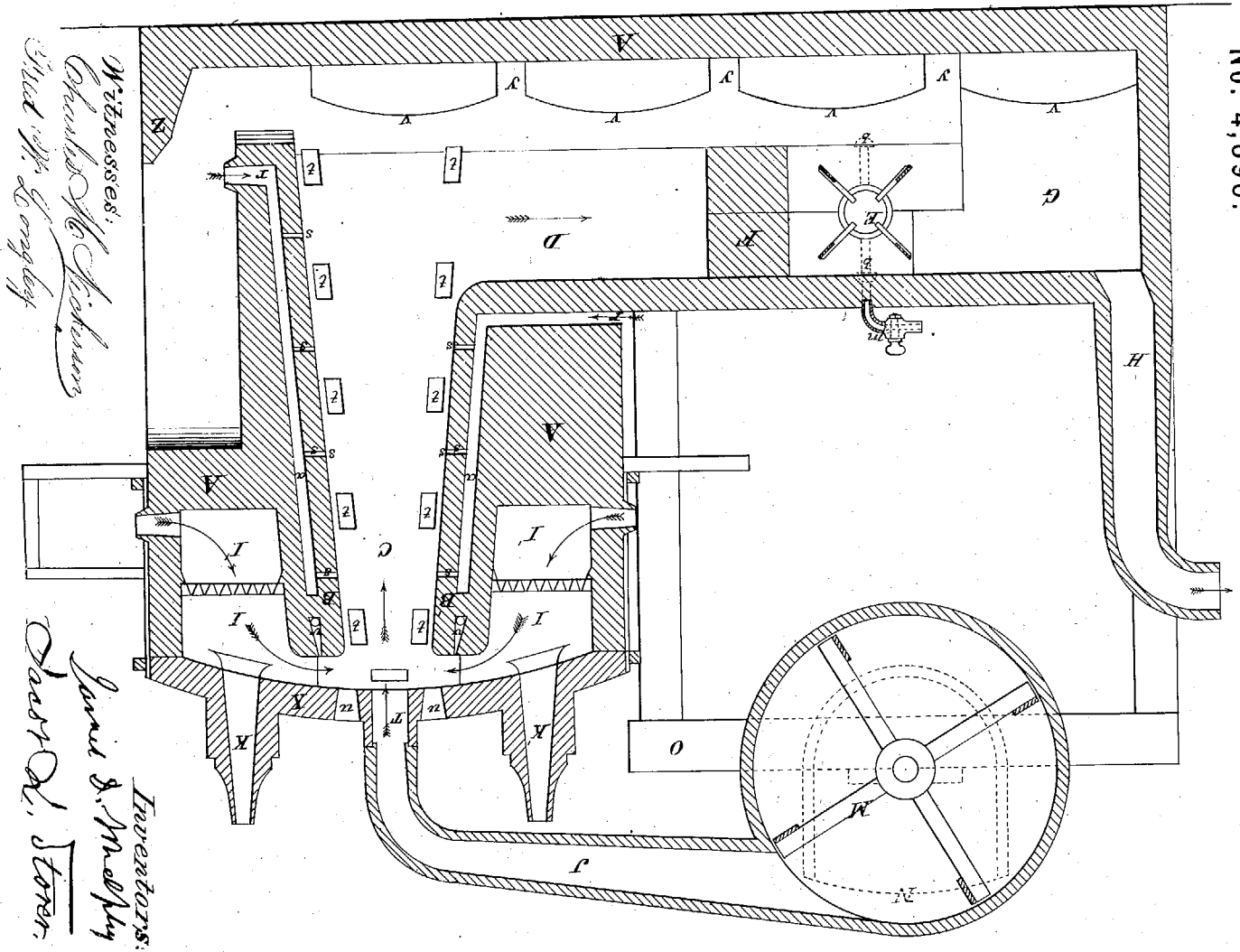
Witnesses:
Charles McNickerson
Fred W. Longley
Inventors:
Jared S. Whelpley
Jacob L. Storer.

UNITED STATES PATENT OFFICE.

JAMES D. WHELPLEY AND JACOB J. STORER, OF BOSTON, MASSACHUSETTS.

IMPROVEMENT IN PROCESSES OF ROASTING, BURNING, AND TREATING METALLIC ORES AND MINERALS.

Specification forming part of Letters Patent No. 41,251, dated January 12, 1864; reissue No. 4,898, dated May 7, 1872.

DIVISION B.

*To all whom it may concern:*

Be it known that we, JAMES D. WHELPLEY and JACOB J. STORER, of Boston, county of Suffolk, and State of Massachusetts, have invented a new and useful Process of Roasting, Burning, and Treating Metallic Ores and Minerals; and we hereby declare the following to be a full and exact description of the same, reference being had to the accompanying sheet of drawing, which forms a part of this specification, and which shows a longitudinal vertical section of a furnace and its appendages suitable for carrying out our invention.

The ore to be treated by our process must be reduced to fine powder, so that as it passes through the furnace it is acted upon throughout. We generally prefer to grind it so as to resemble dust or flour, though this is not necessary in all cases. A distinguishing feature of our invention is that the ore or other substance is aerially supported or carried while it is undergoing the process of roasting or burning. The invention, therefore, consists in forcing or dropping the ore in fine powder, either alone or mixed with fluxes or chemical reagents, through a shaft, flue, or furnace, and subjecting it to heat by means of flame, gases, heated air, or the products of combustion from a suitable furnace, fire-box, or gas-generator. The invention also consists in separating the ore and its products from the gaseous matters by means of water in the form of a shower or spray, in the manner hereinafter described. The invention further consists in subjecting the ore, while it is falling, wafted, or blown through the furnace to the action of steam and heated air, either together or separately, so as to assist and regulate the process of calcining, roasting, and smelting the ore.

The following description will enable any one skilled in the art to make and use our invention.

A is the shell of the furnace, of brick or other suitable material. C is the drop-flue or flame-chimney, from twelve to twenty feet deep, formed by the four partitions B B′. A cross-section of this chimney is a parallelogram measuring at the top six feet by one and one-half, and at the bottom six feet by three. D is a horizontal continuation of the flame-chimney C, supported by the piers Y and arches V, the latter being below the level of the top of the trough or tank Z, so that when said tank is full of water, the surface of the water shall form in effect a bottom to the flue D, which arrangement allows the deposit on the bottom to be raked out under the arches V without disturbing the draught or opening the furnace. F is a partition or three-sided box, extending down from the top of the flue D a little more than half way toward the bottom of the same, leaving a space between the sides of the flue for the draught to pass through the holes *g* in the sides of said box. E is a fan-wheel placed as shown in the drawing, the axle passing through the holes *g* in the sides of the box F, the design of the wheel being to increase the draught and draw into the flame-chimney C through the ports *t* and *u* and passages *r a s* an additional supply of air. Attached to the shaft of the fan-wheel E, outside of the spray-chamber or air-box of the wheel, are arms or dashers, *b*, in the passage-way leading from the chamber to the blower, which arms, when revolving, strike the water, whereby the passages are kept cool with spray, and the flame of the furnace prevented from extending into the wheel. The ends of the arms of the fan-wheel also strike the surface of the water and fill the chamber G with spray by which all the floating dust and particles of metal are wet down, condensed, and deposited on the bottom of the chamber G, and saved instead of being carried off through the chimney H and lost. To further increase the quantity of spray in the spray-chamber, water may be let in through pipes or openings at any convenient point, as through the stop-cock and pipe *m*. I I are the fire-boxes, provided with grates P P, on which the fuel is placed, the air being drawn or forced in through suitable openings in the ash-pits I′. X and K′ are chimneys, provided with dampers, which are intended to be closed except when the fire is being kindled on the grates P P and a direct upward draught is desirable. T is an induction-pipe or hopper on the top of the cover X, and situated directly over the center of the flame-chimney C, as shown in the drawing. M is a fan-blower mounted on a suitable frame, O, and connected with the hopper T by means of the pipe J. N (shown by the dotted line) is a hopper opening into the center of the blower M, into which hopper is fed the finely-pulverized substance to be smelted, burned, or roasted, the same being driven by the current of air generated by the fan, through pipe J into hopper T, and thence into the flame or drop chimney C, where it comes into immediate contact with the flame and heat from the burning fuel in the fire-boxes I I. The column of air from the blower M down through the chimney C increases by lateral suction the draught through the fuel in the fire-boxes; and this draught is still further increased by the combined action of the blower E and the auxiliary blower opening into the ash-pits, (not represented, being in common use in other furnaces.) The blower E is intended to be from five to six times more powerful than the blower M—so powerful as to draw into the chimney C to aid combustion, strong currents of air through all the ports and openings in the sides of the chimney, when required. Indeed in some cases we dispense with the fan-wheel M and depend for the draught entirely on the fan-wheel E and the auxiliary blowers forcing air into the ash-pits, the material to be acted upon by the flame being sifted into the hopper T. When it is required to mingle steam with the flame and gases to produce certain results, it may be admitted from pipes *w* into a chamber, *v*, at the top of the chimney and through an opening, 3.

From the above description it is obvious that a large percentage of the material roasted, burned, or smelted will fall upon the hearth of the furnace, or (when water is used) into the water-bath W. The remaining portion of the material will be drawn by the fan E into the spray-chamber G, where it will be wetted down and condensed, and thereby prevented from being lost by passing out through the chimney H.

We do not limit ourselves to the form of apparatus shown, nor to the relative arrangement of parts, as these may be greatly varied without departing from the nature of our invention. The distinguishing feature of our invention is that the ore in fine powder is blown, floated, or falls through the furnace, and at the same time is subjected to the action of heated gases, fluxes, and chemicals.

Having thus described our invention, what we claim, and desire to secure by Letters Patent of the United States, is—

1. The process herein described for treating ores, the same consisting in forcing or dropping the ore in fine powder through a shaft, flue, or furnace, and subjecting it to heated gas or the products of combustion, substantially as set forth.

2. The process described of separating the products resulting from the treatment of the ore by the use of water in spray, as set forth.

3. The process herein described for treating ores, the same consisting in mixing it in fine powder with suitable fluxes or chemical reagents, and subjecting it, while floated, blown, or drawn through a shaft, flue, or furnace to the action of heat, either with or without the addition of steam, vapors, or gases, all substantially as set forth.

JAMES D. WHELPLEY.
JACOB J. STORER.

Witnesses:
CHARLES M. NICKERSON,
FRED. W. LONGLEY.